United States Patent [19]

Voorhies

[11] Patent Number: 4,750,756
[45] Date of Patent: Jun. 14, 1988

[54] POWER RIDE SHOCK ABSORBER SYSTEM

[76] Inventor: Gerald H. Voorhies, 502 Central Ave., New Port Richey, Fla. 34652

[21] Appl. No.: 20,601

[22] Filed: Mar. 2, 1987

[51] Int. Cl.$^4$ .................. B60G 17/06; B60G 25/00
[52] U.S. Cl. .................................. 280/688; 280/709; 267/64.11
[58] Field of Search .............. 280/709, 688, 689, 701, 280/702, 711; 267/113, 118, 123, 141.3, 64.11

[56] References Cited

U.S. PATENT DOCUMENTS

| 3,784,228 | 1/1974 | Hoffmann | 280/709 |
| 4,162,091 | 7/1979 | Sano | 280/702 |
| 4,306,638 | 12/1981 | Malott | 280/709 |
| 4,341,397 | 7/1982 | Morimura | 280/688 |
| 4,648,623 | 3/1987 | Cameron | 280/688 |

Primary Examiner—Richard A. Bertsch

[57] ABSTRACT

A power ride shock absorber system for a vehicle suspension, of the strut type mounted between the body and the wheel of the vehicle, including a cylindrical cam and cam followers, the cam followers being forced against the cam to create vertical forces to cancel the rate of the supporting springs over or under the spring forces necessary to support the weight of the vehicle under any conditions. This shock absorber is constructed with a hydraulic cylinder that compensates for variations in the passenger or pay load in the vehicle and to maintain the position of the cam followers on the center of the cam under any and all conditions. This system enables the use of a much higher rated supporting spring that provides much better stability in the vehicle and also provides a much smoother ride. This power ride shock absorber can be installed inside the supporting spring as a strut or can be installed in any available space outside the spring.

9 Claims, 4 Drawing Sheets

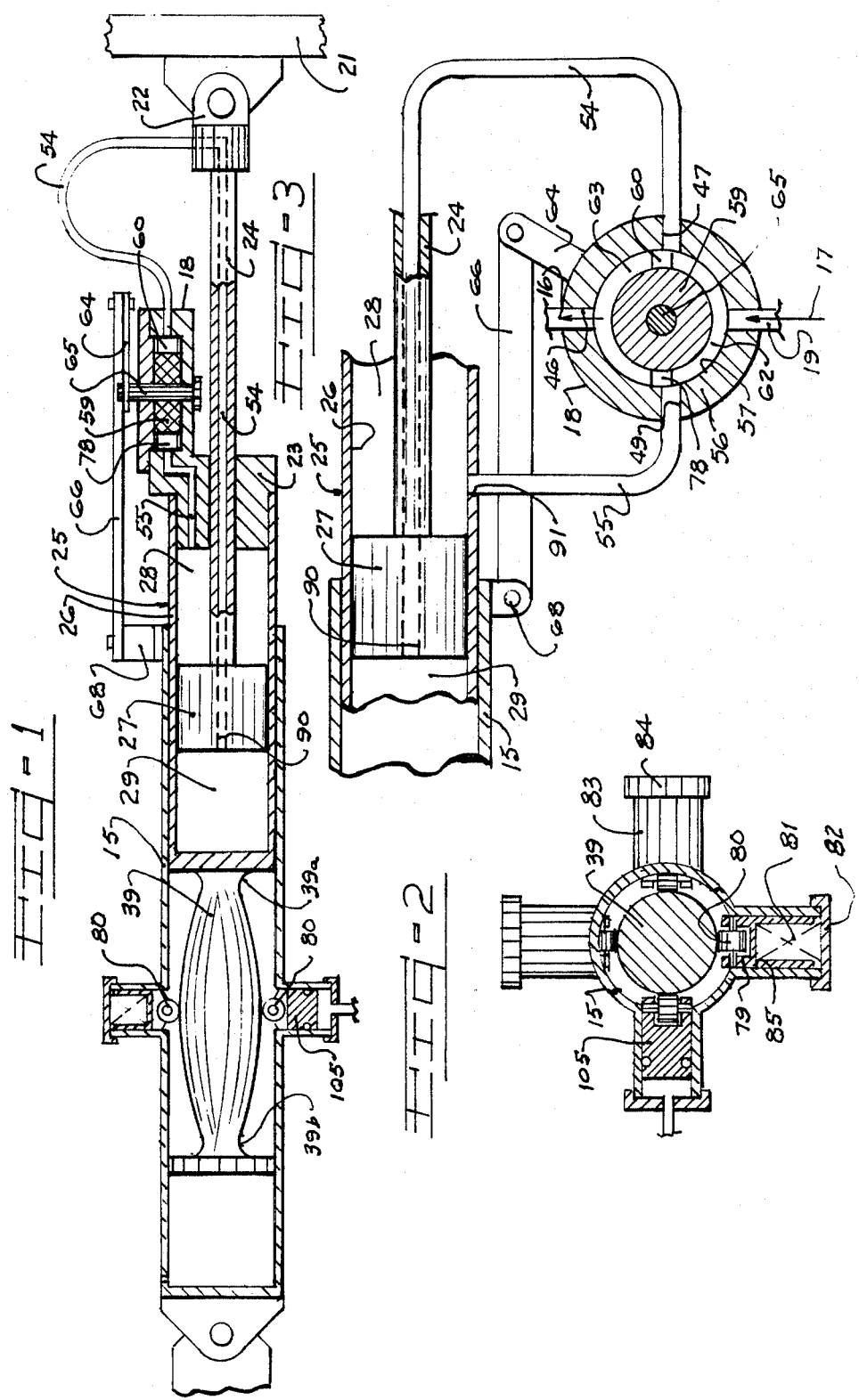

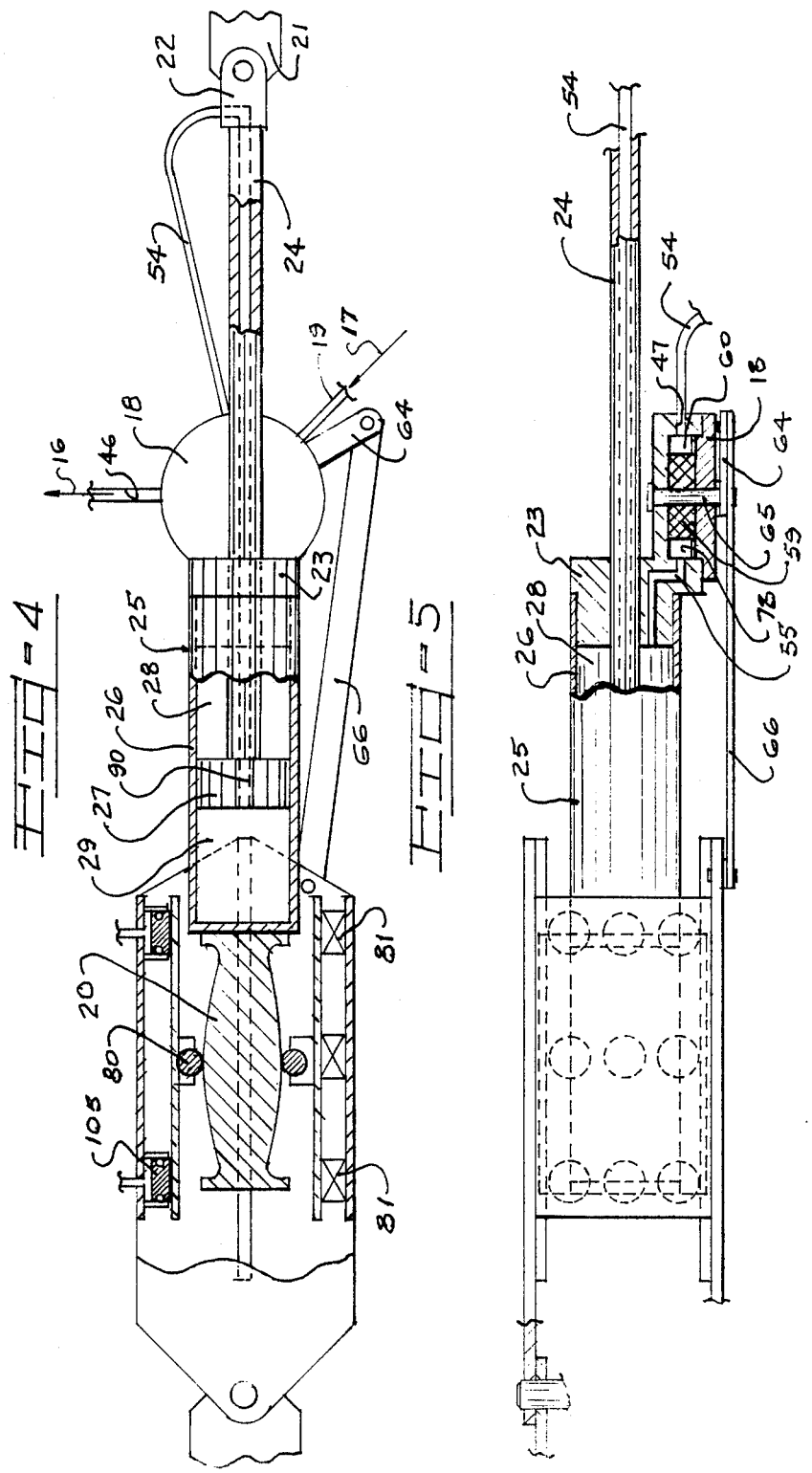

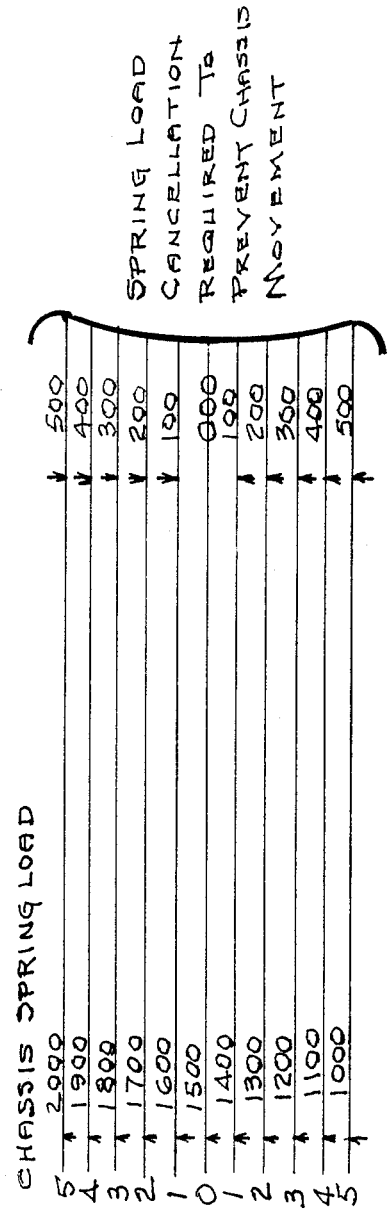
FIG_6
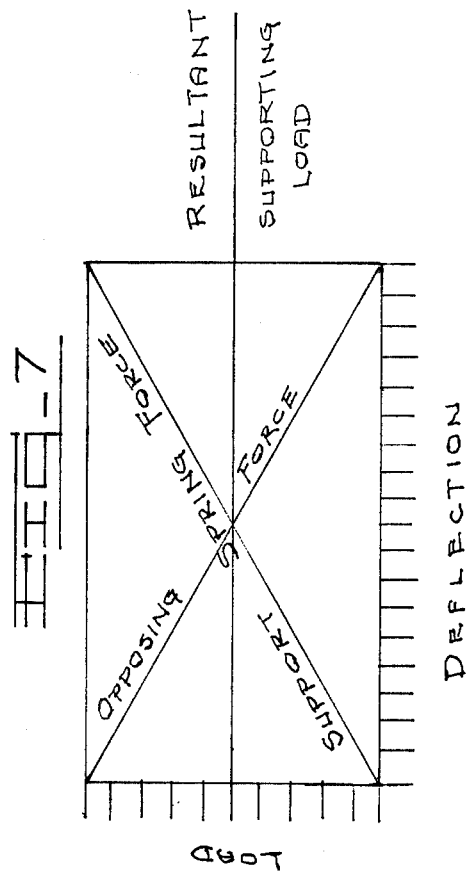
FIG_7

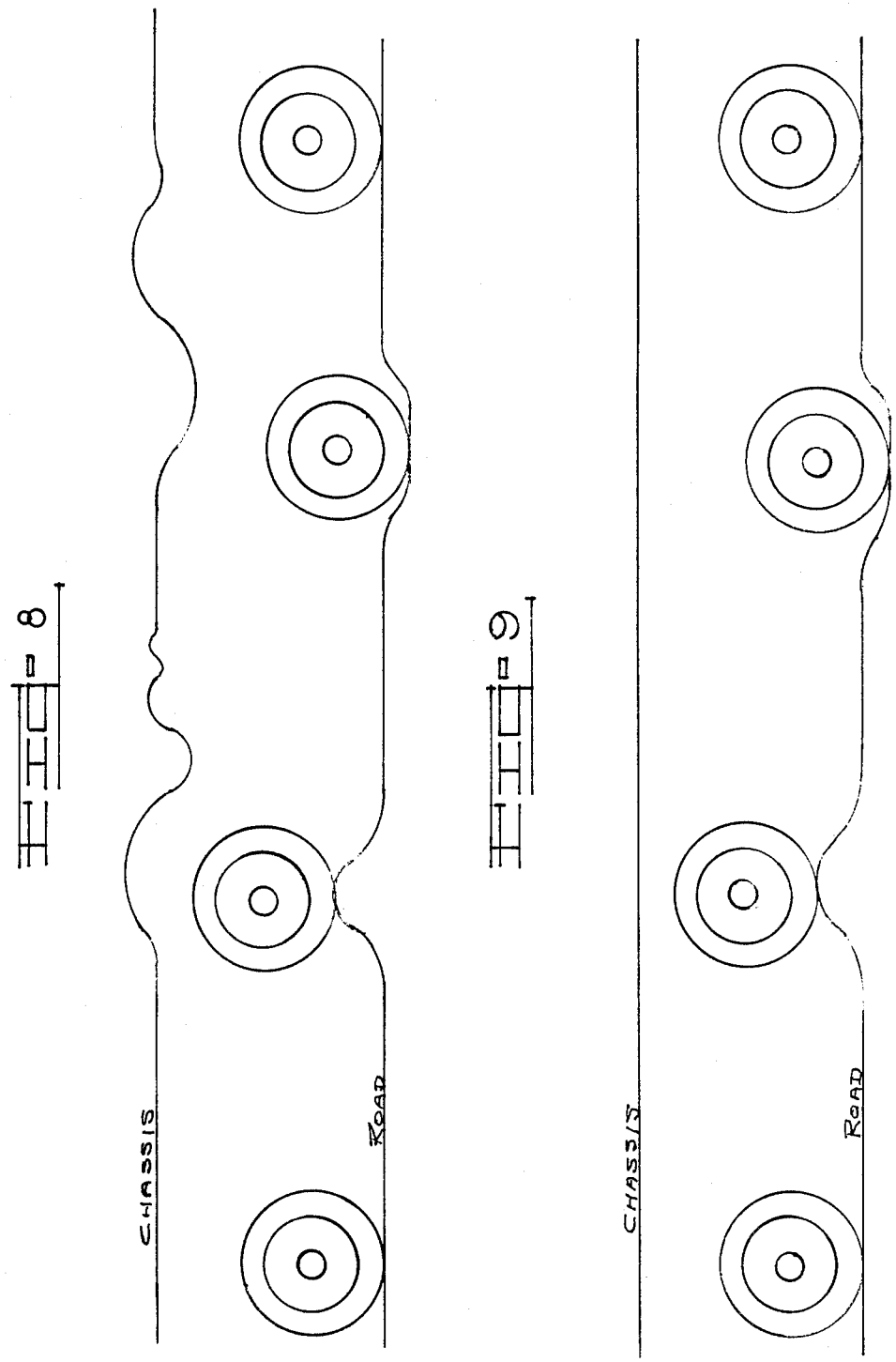

POWER RIDE SHOCK ABSORBER SYSTEM

This invention generally relates to a Power Ride Shock Absorber System and more particularly relates to a compensated Shock Absorber System.

In conventional spring suspension systems common in the automotive practice today, the variation and load requirements are taken care of by the rate of the spring. For example, any amount of change in the load deflects the spring to a point producing the proper load with the rate of the spring determining the amount of spring compression necessary for supporting the load. When the spring is compressed, as when the wheel strikes a bump, the spring exerts a force on the body momentarily greater than the force necessary to support the body. As a result of this, the body must move upwards. In the case of the wheel dropping in a hole, the spring is opened to a point where momentarily it lacks the force to support the body and therefore the body drops. Added to this arrangement are conventional shock absorbers which offer resistance in both directions to damp out the motion of the body as a result of the sudden change in load but, at the same time, increasing the rate of acceleration of the body during the first impact or during the impact after the wheel has dropped into a hole. Therefore, since the force applied to the body is alternately less than or more than the amount necessary to support the body, an almost continuous motion is set up when the vehicle is traveling over a road having irregularities thereon. For these reasons, car manufacturers have continually tried to reduce the rate of the spring so that the amount of excessive pressure, or lack of pressure to support the body could be lessened. The lowest possible rate would produce the best possible ride, when vertical motion of the body alone is considered. However, the problems of stability and natural vibrations which obviate the use of extremely low rate springs as well as the problems this produces in the position of the car body with respect to the wheel when the passenger load is changed. In other words, the lower the rate of the spring the greater distance the body will drop with respect to the wheel for a given added passenger load.

The present Shock Absorber System eliminates the problems of the prior art by providing a device which will cancel the rate of the spring due to vertical motion of the wheels and also compensate for load changes on the body. A motor vehicle is provided with a conventional chassis or load spring and has interposed between the car body and the wheel a Shock Absorber System comprising a cam and rollers, one of which is attached to the body and the other attached to the axle or wheel spindle. A series of springs or pressured pistons applies a force to the rollers or skids which contacts the cam in nearly a horizontal plane to create a vertical force component. The cam is constructed and the horizontal pressure supplied to the rollers or skids is provided, such that throughout the range of available travel thereof the rate of the spring will be cancelled or counteracted by the vertical force component with the load remaining the same as the load that exists when the contact of the rollers is centered on the cam at a point where the vertical component would be zero or where the angle of contact would be 90 degrees to the line of force. This Shock Absorber System permits the use of a much higher rate chassis load spring. The use of a higher rate chassis or load spring results in a lesser change in the position of the body as related to the wheel for a given passenger load. Therefore, with regard to the bumps and holes the wheel would encounter in an ordinary road the vehicle body would be maintained at a constant height because the pressure or force supporting the body would not change and it is necessary to have an outside force in order to move the body. However, motor vehicles do not only encounter continuous straight motion, the body load changes when turns are encountered, brakes are applied, or passenger load varied. Therefore, to counteract these body load changes there is provided an automatic servomotor system which is connected to the cam to effect the adjustment of the position of the body. Since the natural frequencies of the wheel of a vehicle is in the order of ten times that of the body, the velocity of the servomotor is modified so that the relatively fast motion of the wheel would cause very little, if any, motion of the cam whereas the comparatively slow motion of the body would effect a considerable movement of the cam.

Therefore, it is an object of the present invention to provide a Shock Absorber System which will cancel the rate of the chassis or load spring over or under the rate actually required to support the weight of the vehicle under any conditions, allowing the body to ride smoothly over bumps and holes.

It is another object of the present invention to provide a Shock Absorber System having a deflection load rate sufficient only to overcome friction in the moving parts throughout a predetermined range of travel and having a means for automatically adjusting the load carrying capacity to support a variable weight.

It is another object of the present invention to provide a Shock Absorber System in which the rate of the supporting springs is counteracted and the load carrying capacity is automatically adjusted to support the variable load throughout a predetermined range of travel.

It is another object of the present invention to provide a Shock Absorber System wherein the rate of the chassis load spring is counteracted or cancelled by a vertical force produced by a series of control springs or pressured pistons urging the cam follower rolls or skids against the cams to provide a vertical force equal to the change in load of said chassis load spring to cancel or counteract said chassis load spring rate and also provide an automatic servomotor mechanism which will counteract varied loads encountered by change in passenger load or changes created by centrifugal forces when turns are encountered.

It is another object of the present invention to provide a Shock Absorber System for a vehicle body that will maintain the body at a predetermined level and at a constant horizontal plane even when the wheel or wheels of said body encounters depressions and bumps in the surface the body is traveling over and will compensate for load changes encountered by the body due to acceleration, deceleration, and turns of said vehicle.

Other features, objects and advantages of the present invention will become apparent to those skilled in the art after careful consideration of the following detailed description taken in conjunction with the accompanying drawings wherein like reference numerals refer to like and corresponding parts.

ON THE DRAWINGS:

FIG. 1 is a partial side elevation view with parts in cross-section illustrating a shock absorber system constructed in accordance with the principles of the present invention;

FIG. 2 is an enlarged sectional view of the cam and follower mechanism utilized in the shock absorber system illustrated in FIG. 1 and being constructed in accordance with the principles of the present invention;

FIG. 3 is a partial cross-sectional view with parts in elevation illustrating a servomotor control valve constructed in accordance with the principles of the present invention;

FIG. 4 is a partial side elevation view with parts in cross-section illustrating another embodiment of a shock absorber system constructed in accordance with the principles of the present invention; and FIG. 5 is a partial elevation view with parts in cross-section illustrating a shock absorber system constructed in accordance with the principles of the present invention.

FIG. 6 is a chart illustrating the forces necessary to counteract and prevent body movement for a given chassis spring load constructed in accordance with the principles of the present invention.

FIG. 7 is a graph illustrating the cancelling effect of the forces illustrated by the chart of FIG. 6—constructed in accordance with the principles of the present invention.

FIG. 8 is a schematic illustration of the effects of a shock absorber system constructed in accordance with the principles of the prior art.

FIG. 9 is a schematic illustration of a shock absorber system constructed and operating in accordance with the principles of the present invention.

AS SHOWN ON THE DRAWINGS

Referring to FIGS. 1, 3, 4 and 5, the servo means 25 comprises a cylindrical piston housing 26 having a piston 27 mounted therein and dividing the housing into two pressure chambers 28 and 29 respectively. The housing 26 FIG. 1 has the cam 39 suitably attached to the bottom thereof. A port 55 formed in the housing end cap communicates with the pressure chamber 28 and a port 54 communicates wtih the pressure chamber 29.

Suitable piston rod or hollow shaft 24 are integral with or suitably attached to the end of the piston 27 and project through the end cover 23 of housing 26. The piston rod or hollow shaft 24 having a suitable means 22 attaching said rod or hollow shaft to main frame 21 of a vehicle. The end cover 23 of housing 26 forms a sealing fit with piston rod or hollow shaft 24 that allows the housing 26 to slide axially along said piston rod or hollow shaft 24 without losing fluid from within the chambers 28 and 29. Therefore, when pressure in chamber 29 is greater than the pressure in chamber 28, the housing will move downwards with its end cover 23 moving towards the piston 27 to move the cams 20 and 39 respectively downwards. Likewise, when the pressure in chamber 28 is greater than the pressure in chamber 29, the housing 26 and cam 20 and 39 respectively will move upwards and its end cover 23 will move away from the piston 27.

The relative pressures in the chambers 28 and 29 are regulated by a servomotor controlled rotary valve mechanism 18 suitably attached to the compensator 25. The rotary control valve 18 has outlets 46, 47 and 49 and an inlet 19. The inlet 19 is connected by conduit 17 to a suitable fluid pump means (not shown) which may be suitably operated by the engine of a motor vehicle or by other suitable means. The outlet 46 is connected by suitable conduit 16 to the pump means to return fluid thereto and to be circulated thereby.

A conduit 54 communicates with the outlet 47 with the pressure chamber inlet 90 and a conduit 55 communicates with the valve outlet 49 with the servomotor port 91.

The interior of the control servovalve 18 has a cylindrical housing 56 defining a cylindrical chamber 57. A cylindrical valve member 59 is concentric with the servovalve chamber 57 and has a diameter less than the diameter in the chamber 57. Projecting from the surface of the valve member 59 are valve means 60 and 78 that divide the interior of the valve into two flow passages 62 and 63 and also act to simultaneously have slight openings in the diametrically opposed outlets 47 and 49 when the valve 59 is in its normal position, as shown in FIG. 3 it is understood that the outlets 47 and 49 may be closed in the normal position if such is desired. However, it is preferable to have the outlets slightly open to maintain fluid pressure balance in the system and substantially prevent pressure voids from occuring.

The valve member 59 is rotatably mounted within the valve housing 56 and has suitable sealing means thereon. The valve member 59 has one end of a lever arm 64 suitably attached by means 65 thereto. The other end of the lever arm 64 is pivotally connected to one end of a vertical arm 66 with the other end of the vertical arm 66 pivotally connected to the connecting link 68 that is attached to the cam housing 15, FIG. 1 by suitable means 68.

The cam 39 is provided with a top shoulder portion 39a and a bottom shoulder 39b that limit the vertical travel of the follower roll 80. A cylindrical follower housing 83 FIG. 2 is suitably affixed to the cam housing 15. The follower housing 83 has four tubular walls projecting from the outer surface of cam housing 15 and being equally spaced from each other. Each tubular wall defines an inner passage 85 communicating with the interior of the cam housing 15. Mounted within each tubular wall is a cam follower mechanism 79 having a cam roller or skid 80 at the end thereof extending within the interior of the housing 83 and adapted to engage the surface of cam 39. The follower rolls are urged against the surface of cam 39 by control springs 81 or pressured pistons 105 which are suitably enclosed in the tubular housing by covers 84 and 82 respectively.

Referring to FIG. 6; It is a chart illustrating the rate of cancellation of the chassis supporting spring.

We are assuming a spring load of 1500# per wheel and the springs with a rate of 100# per inch. The rate cancellation chart shows the 1500# at zero forces on the cam. The cam follower being located at the zero point on the cam which does not produce any force in either direction, up or down. Now, when a wheel drops into a hole, assume 3" deep, and since the cam followers are attached to the wheel structure they also move downward 3". In this position the supporting spring is only producing a 1200# upward force to support the weight of the vehicle, and the vehicle requires a 1500# upward force or it would drop the 3". The cam followers being forced against the cam creates the upward force of the 300# that is required to support the chassis, therefore the vehicle chassis does not drop.

Now when the wheel hits a bump assume that the wheel raises 3" upward and again since the cam followers are attached to the wheel structure, they also move upward 3". In this position the supporting spring is producing an 1800# upward force to support the weight of the vehicle chassis and the chassis requires only 1500# force or it would move upward the 3". Again, the cam followers being forced against the cam creates a downward force of the 300# that will cancel the rate of the supporting spring, therefore the vehicle chassis will not move upward.

Referring to FIG. 7; These vertical forces that cancel the rate of the supporting spring is determined by the force of the springs behind the cam followers forcing the cam followers against the cam of a predetermined design. This relationship between the deflection of the chassis supporting spring is brought out by the chart illustrated in FIG. 6 and the graph illustrated in FIG. 7.

Referring to FIG. 8; There is schematically illustrated the typical riding characteristics of a motor vehicle utilizing a conventional shock absorber system constructed in accordance with the principles of the prior art.

When a wheel is travelling down a road and comes to a bump in the road, it say's "I want to come up" and the shock absorber say's "No you can't come up" resulting in all of the forces of the impact of the tire hitting the bump with the weight of the unsprung load and the sprung load all behind the forces of the impact. Now when the wheel comes to a hole in the road, it say's, "I want to go down" and the shock absorber say's, "No you can't go down" and the shock absorber resists the downward motion of the wheel dropping into the hole, which results in the frame or chassis plus the body of the vehicle dropping due to momentarily lacking enough forces to support the weight of the vehicle. Now when the tire reaches the far side of the hole, it say's, "I want to come up", and the shock absorber say's, "No you can't come up" resulting in all of the forces of the impact of the tire hitting the far side of the hole with the weight of the unsprung load and the sprung load of the vehicle all behind the impact.

It appears that the conventional shock absorber systems constructed in accordance with the principles of the prior art are merely stabilizers that are mounted between the sprung and the unsprung members, and do not absorb shocks, but do tend to stabilize or keep the tire on the road.

Referring to FIG. 9; The rate controlled shock absorber system constructed in accordance with the principles of the present invention is based on the cancellation of the rate of the chassis supporting spring, and in some respects, operates nearly opposite the conventional type shock absorber.

In other words, when the wheel of a vehicle is travelling down a road and comes to a bump in the road, the wheel say's, "I want to come up" and the power ride shock absorber say's "I will help you come up" and when the wheel raises, the cam followers being forced against the cam of predetermined design, creates an upward force on the wheel structure and at the same time is cancelling the rate of the chassis supporting spring that automatically creates a downward force on the chassis that does not allow the chassis to raise. Now when the wheel of a vehicle is travelling down a road and comes to a hole in the road, the wheel say's "I want to go down" and the power ride shock absorber say's "I will help you go down" and when the wheel drops into the hole, the cam followers being forced against the cam of predetermined design, creates a downward force on the wheel structure and at the same time is cancelling the rate of the chassis supporting spring that automatically creates an upward force on the chassis that does not allow the chassis to drop.

This means that the power ride shock absorber system constructed and operating in accordance with the principles of the present invention does not allow the body and chassis of a vehicle to raise or drop when the wheels encounter holes or bumps in the road, as it is necessary to have an outside force in order to move the body and chassis.

The power ride shock absorbers not only operate when the vehicle is travelling in a continuous straight motion with bumps and holes but also operates effectively when the body load changes, when turns are encountered, brakes are applied, or passenger load changes. The only purpose of the hydraulic power on this shock absorber system is to compensate for these variations in loads that are noted above, other than these, the hydraulic power would not be required.

It is a known fact that the automobile manufacturers have continually tried to reduce the rate of the chassis supporting spring so that the amount of excessive pressure, or the lack of pressure to support the chassis could be lessened. The lowest possible spring rate would produce the best possible ride, when vertical motion of the body alone is considered. However, the problems of stability and natural vibrations which obviate the use of extremely low rate supporting springs as well as the problems this produces in the position of the car body with respect to the wheel when passenger load is changed. In other words, the lower the rate of the supporting spring the greater distance the body will drop with respect to the wheel for a given passenger load. This power ride shock absorber system can be installed on any vehicle regardless of the type of the suspension system, provided that the vehicle is equipped with power steering, although the ultimate would be to increase the rate of the chassis supporting spring to provide maximum stability.

The present invention allows a vehicle to use a chassis spring which has a very high rate to substantially reduce the change in the jounce space with changes in body load and also to substantially eliminate the listing of the vehicle in a turn.

Therefore, I have provided a shock absorber system wherein the rate of the springs is counteracted for any rapid motion such as the wheel passing over irregularities by a first means and any body load change requirements of relatively long duration, such as a change in a passenger load, or change in the center of gravity due to centrifugal force in a turn or inertia in brake applications are compensated for by a second means which moves the first means to a new position to counteract load change due to vertical wheel movement from the new normal position of the chassis spring and shock absorber system means that will substantially maintain its axial position regardless of body load changes and vertical wheel movement.

Although I have herein set forth and described my invention with respect to certain specific principles and details thereof, it will be understood by those skilled in the art that these may be varied without departing from the spirit and scope of this invention as set forth in the hereunto appended claims.

I claim as my invention:

1. A Shock Absorber System for a vehicle having a suspension system with a support spring, a sprung member and an unsprung member, said Shock Absorber System mounted between the two said members, said Shock Absorber System comprising a cam and cam followers respectively attached to the sprung and unsprung members, spring means forcing said cam and followers together, the cam having a contour engaging the followers to provide a vertical force component acting between the sprung and unsprung members compensating for the change in dynamic load that would otherwise be transmitted to the support spring when there is vertical movement of the unsprung member relative to the sprung member, said Shock Absorber System further comprising a means for automatically adjusting the position of the cam relative to the sprung member at a rate faster than the frequency of the sprung member and slower than the frequency of the unsprung member to counteract the effect of changes in level of the sprung member on the cam.

2. A Shock Absorber System for a vehicle having a suspension system with a support spring, a sprung member and an unsprung member, said Shock Absorber System mounted between the two said members, said Shock Absorber System comprising a cam and cam followers respectively attached to the sprung and unsprung members, spring means forcing said cam and followers together, the cam having a contour engaging the followers to provide a vertical force component acting between the sprung and the unsprung members compensating for the change in dynamic load that would otherwise be transmitted to the support spring when there is vertical movement of the unsprung member relative to the sprung member, said Shock Absorber System further comprising an automatic servomotor compensator for automatically adjusting the position of the cam relative to the sprung member at a rate faster than the frequency of the sprung member and slower than the frequency of the unsprung member to counteract the effect of changes in level of the sprung member on the cam, said automatic servomotor compensator including a piston and cylinder respectively carried by the sprung member and the cam, means for flowing hydraulic fluid to said cylinder for shifting the cam relative to the sprung member, and a servovalve actuated by the cam followers controlling the flow of hydraulic fluid to said cylinder.

3. A Shock Absorber System for a vehicle suspension system having a support spring, a sprung member and an unsprung member, said Shock Absorber System mounted between the two said members, comprising a cam and cam followers respectively attached to the sprung and unsprung members, spring means forcing said cam and followers together, the cam having a contour engaging the followers to provide a vertical force component acting between the sprung and unsprung members compensating for the change in dynamic load that would otherwise be transmitted to the support spring when there is vertical movement of the unsprung member relative to the sprung member, said Shock Absorber System further comprising a means for automatically cancelling, at a rate faster than the frequency of the sprung member and slower than the frequency of the unsprung member, the effect of changes in level of the sprung member on the cam.

4. A Shock Absorber System for a vehicle suspension system having a support spring, a sprung member and an unsprung member, said Shock Absorber System mounted between the two said members, said Shock Absorber System further comprising a dual faced cam and dual cam followers, coacting with each face of cam, spring means forcing the cams and followers together, the cams having a contour engaging the followers to provide a vertical force component acting between the sprung and unsprung members compensating for the change in dynamic load that would otherwise be transmitted to the support spring when there is vertical movement of the unsprung member relative to the sprung member, and a means for automatically adjusting at a rate faster than the frequency of the sprung member and slower than the frequency of the unsprung member, the relative positions of the cams and followers to counteract for changes in level of the sprung member on the cams and followers.

5. A Shock Absorber System for a vehicle having a suspension system which comprises a support spring, an unsprung member carrying said support spring, a sprung member carried by said support spring, said Shock Absorber System having means applying a force equal and opposite to the change in dynamic load that would otherwise be transmitted to the support spring when there is vertical movement of the support member relative to the sprung member, and means responsive to changes in position of the sprung member caused by load changes thereon for varying the initiation of said force at a rate faster than the natural frequency of the sprung member and slower than the frequency of the support member to minimize movement of the sprung member regardless of load changes on both the support member and the sprung member.

6. A Shock Absorber System for a vehicle having a suspension system with a support spring, a sprung member and an unsprung member, said Shock Absorber System mounted between the two said members, said Shock Absorber System comprising a cam and cam followers respectively attached to the sprung and unsprung members, pressured pistons forcing said cam and followers together, the cam having a contour engaging the followers to provide a vertical force component acting between the sprung and unsprung members compensating for the change in dynamic load that would otherwise be transmitted to the support spring when there is vertical movement of the unsprung member relative to the sprung member, said Shock Absorber System further comprising a means for automatically adjusting the position of the cam relative to the sprung member at a rate faster than the frequency of the sprung member and slower than the frequency of the unsprung member to counteract the effect of changes in level of the sprung member on the cam.

7. A Shock Absorber System for a vehicle having a suspension system with a support spring, a sprung member and an unsprung member, said Shock Absorber System mounted between the two said members, said Shock Absorber System comprising a cam and cam followers respectively attached to the sprung and unsprung members, pressured pistons forcing said cam and followers together, the cam having a contour engaging the followers to provide a vertical force component acting between the sprung and the unsprung members compensating for the change in dynamic load that would otherwise be transmitted to the support spring when there is vertical movement of the unsprung member relative to the sprung member, said Shock Absorber System further comprising an automatic servomotor compensator for automatically adjusting the position of the cam relative to the sprung member at a rate faster than the frequency of the sprung member and slower than the frequency of the unsprung member to counteract the effect of changes in level of the sprung member on the cam, said automatic servomotor compensator including a piston and cylinder respectively carried by the sprung member and the cam, means for flowing hydraulic fluid to said cylinder for shifting the cam relative to the sprung member, and a servovalve actuated by the cam followers controlling the flow of hydraulic fluid to said cylinder.

8. A Shock Absorber System for a vehicle suspension system having a support spring, a sprung member and an unsprung member, said Shock Absorber System mounted between the two said members, comprising a cam and cam followers respectively attached to the sprung and the unsprung members, pressured pistons forcing said cam and followers together, the cam having a contour engaging the followers to provide a vertical force component acting between the sprung and unsprung members compensating for the change indynamic load that would be transmitted to the support spring when there is vertical movement of the unsprung member relative to the sprung member, said Shock Absorber System further comprising a means for automatically cancelling at a rate faster than the frequency of the sprung member and slower than the frequency of the unsprung member, the effect of changes in level of the sprung member on the cam.

9. A Shock Absorber System for a vehicle suspension system having a support spring, a sprung member and an unsprung member, said Shock Absorber System mounted between the two said members, said Shock Absorber System further comprising a dual faced cam and dual cam followers, coacting with each face of cam, pressured pistons forcing the cams and followers together, the cams having a contour engaging the followers to provide a vertical force component acting between the sprung and unsprung members compensating for change in dynamic load that would otherwise be transmitted to the support spring when there is vertical movement of the unsprung member relative to the sprung member, and a means for automatically adjusting at a rate faster than the frequency of the sprung member and slower than the frequency of the unsprung member, the relative positions of the cams and followers to counteract for changes in level of the sprung member on the cams and followers.

* * * * *